United States Patent [19]
Alburger

[11] 3,751,970
[45] Aug. 14, 1973

[54] INSPECTION PENETRANT PROCESS AND COMPOSITION FOR AIDING REMOVAL OF EXCESS PENETRANT FROM TEST PART SURFACES

[76] Inventor: James R. Alburger, 5007 Hillard Ave., La Canada, Calif.

[22] Filed: Feb. 9, 1972

[21] Appl. No.: 224,656

Related U.S. Application Data

[63] Continuation-in-part of Ser. No. 804,200, March 4, 1969, which is a continuation-in-part of Ser. No. 787,381, Dec. 27, 1968, and a continuation-in-part of Ser. No. 675,896, Oct. 17, 1967, Pat. No. 3,429,826, which is a continuation-in-part of Ser. No. 497,058, Oct. 18, 1965, Pat. No. 3,349,041.

[52] U.S. Cl.................... 73/36, 73/104, 252/364, 252/312, 252/316, 252/162, 252/351, 252/357
[51] Int. Cl... G01m 3/20, G01n 21/16, G01n 21/38
[58] Field of Search.................. 252/312, 408, 49.3, 252/49.5, 364, 162, 163, 172; 73/36, 104, 105

[56] References Cited

UNITED STATES PATENTS

| 2,262,926 | 11/1941 | Edgar et al. ...................... 225/49.3 |
| 2,279,001 | 4/1942 | Matheson et al. .................. 252/172 |
| 2,339,715 | 1/1944 | McOmic et al. .................... 252/49.3 |
| 2,632,347 | 3/1953 | Sproule et al. ..................... 252/49.3 |

*Primary Examiner*—John D. Welsh

[57] ABSTRACT

Oil and/or water compatible gel or emulsion forming compositions are disclosed for use in treating test parts in an inspection penetrant process. Following treatment of test parts such as, for example, jet engine turbine buckets, with a fluorescent penetrant, it is desired to remove excess penetrant from the surface of said test parts without leaving smears and spots of blotchy fluorescent residues thereon. Such removal may be accomplished effectively using a composition comprising, for example, dimethyl formamide, methylene chloride, mineral thinner and ethylene glycol monobutyl ether.

6 Claims, 1 Drawing Figure

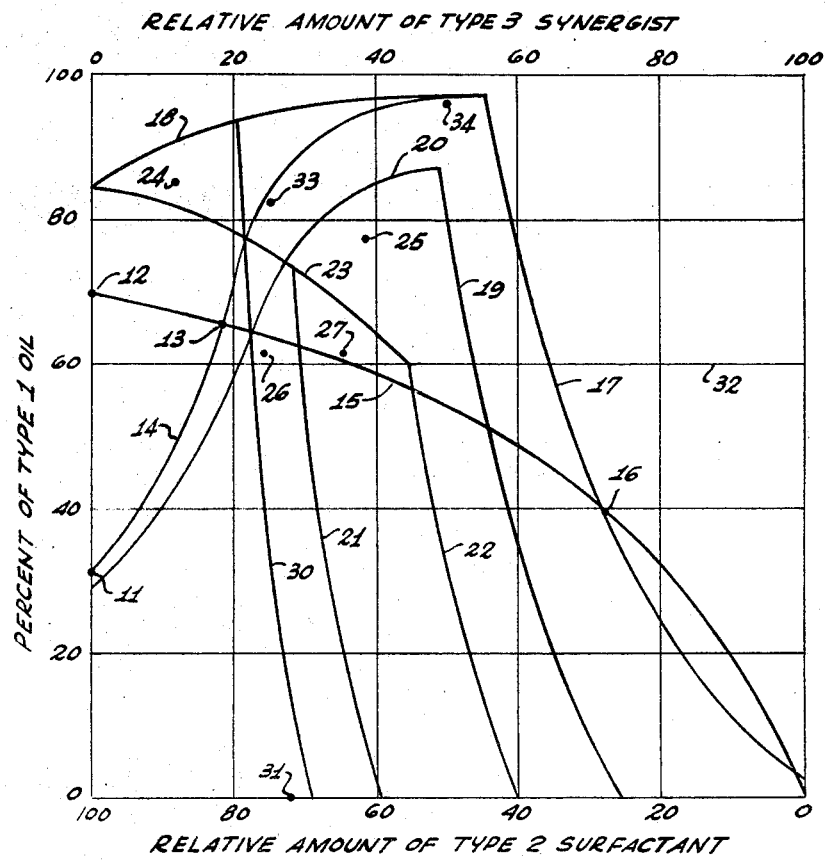

INSPECTION PENETRANT PROCESS AND COMPOSITION FOR AIDING REMOVAL OF EXCESS PENETRANT FROM TEST PART SURFACES

This application is a continuation-in-part of my copending application, Ser. No. 804,200, filed Mar. 4, 1969 (now abandoned), for "Oil-Water Compatible Compositions Employing Non-Surface-Active Constituents", which application was a continuation-in-part of my copending application, Ser. No. 787,381, filed Dec. 27, 1968, for "Oil-Water Compatible Compositions and Methods of Preparing Same", which application was a continuation-in-part of my copending application, Ser. No. 675,896, filed Oct. 17, 1967, now issued U.S. Pat. No. 3,429,826, for "Gel-Forming Inspection Penetrant and Emulsifier Compositions Employing Hydrophilic and Lipophilic Surfactants", which latter application was a continuation-in-part of application, Ser. No. 497,058, filed Oct. 18, 1965, now issued U.S. Pat. No. 3,349,041, for "Gel-Forming Inspection Penetrant and Emulsifier Compositions".

RELATED PATENTS AND PATENT APPLICATIONS

U.S. Pat. No. 3,107,298 — "Apparatus for the Measurement of Fluorescent Tracer Sensitivity".

U.S. Pat. No. 3,164,006 — "Evaluation Performance of Liquid Penetrant Tracer Materials".

U.S. Pat. No. 3,282,843 — "Emulsifier Compositions".

U.S. Pat. No. 3,300,642 — "Method for Changing and Restoring the Sensitivity Characteristic of Diluted Penetrants".

U.S. Pat. No. 3,311,479 — "Penetrant Inspection Process and Compositions".

U.S. Pat. No. 3,349,041 — "Gel-Forming Inspection Penetrant and Emulsifier Compositions".

U.S. Pat. No. 3,386,920 — "Process for Fluorescence Detection of Extremely Small Flaws".

U.S. Pat. No. 3,415,112 — "Water-Free Penetrant Inspection Process and Compositions".

Application Ser. No. 590,353 (now abandoned) — "Method and Means for Improving Flaw Entrapment Efficiency in Water-Washable Penetrants".

U.S. Pat. No. 3,429,826 — "Gel-Forming Inspection Penetrant and Emulsifier Compositions Employing Hydrophilic and Lipophilic Surfactants".

Application Ser. No. 787,381 (now abandoned) — "Oil-Water Compatible Compositions and Methods of Preparing Same". (Parent application).

The present invention relates to emulsifier compositions which have a compatibility with both oil and water. More particularly, the invention relates to emulsifier compositions which employ, as at least the essential ingredients, non-surface-active liquids, these new and novel compositions being employable in a variety of industrial and commercial processes.

In the fields of emulsifiers and water-compatible oily compositions, it appears that most of the presently known formulations utilize surface-active compounds as the essential ingredient or ingredients. With respect to inspection penetrant processes and applicable materials which employ oily, water-washable or self-emulsifiable compositions, there has been a continuing need for improvements in the performance characteristics of such materials.

Emulsifier compositions for this application are well known in the art, and, as stated above, they have usually been constructed of surface-active detergents, or similar compounds, along with various extender liquids, light oils, or volatile diluents, depending on the mode of usage. In many applications, of which inspection penetrant usage is but one example, there are cases where it may be desired to avoid the use of surface-active chemical compounds. In certain of such applications, it may also be desired that features of gel-formation of emulsion-formation may be obtained.

The principal object of the invention, therefore, is to provide new and useful types of oil-water-compatible gel-forming and emulsion-forming compositions.

Another object of the invention is to provide new and useful oil-water-compatible compositions which employ non-surface active constituents.

Still another object of the invention is to provide new and useful types of water-washable inspection penetrant compositions in which non-surface-active constituents are employed.

These and other objects of the invention will be made more apparent in the following description thereof when read in conjunction with the accompanying drawing, in which a matrix diagram is shown which indicates the water-compatibility features of oily mixtures which fall in a field of possible compositions.

In accordance with the present invention there are provided various useful emulsifiable and gel-forming compositions which may be formulated by use of seven types of ingredients. With respect to oil-in-water compositions of the invention, the seven types of ingredients are as follows:

1. A haze-responsive oil (base)
2. A haze-producing water-soluble surfactant
3. A haze-reducing oil-soluble synergist
4. An oil-water mutual solvent (coupler)
5. An extender liquid
6. An additive
7. Water In essence, this invention involves a method of mixing an essential type 2 ingredient with other ingredients, types 3 and 4, these being selectively used singly and in combination to provide a composition which is compatible with either of the types 1 and 7 ingredients, separately or simultaneously. The method further permits the use of types 5 and 6 ingredients for specific purposes of economy and utility. In some cases, the composition, as prepared ready for use, may not contain either of the types 1 or 7 ingredients, while in other cases either one or both of these types 1 and 7 ingredients may be included in the finished composition.

The compositions of the invention may be derived by mixing the types 2 and 3 constituents in appropriate proportional amounts so as to provide a desired oil-water compatibility, gel-break, or emulsification characteristic as may be desired. The type 4 ingredient may be included in the composition for the purpose of assisting in clearing any haze which may be developed, and either one, both, or neither, of the types 5 and 6 ingredients may be included in the composition, depending on the desired utility of the composition.

In my above-mentioned copending application, Ser. No. 787,381, of which the present application is a continuation-in-part, I have disclosed oil-in-water compositions which utilize various surfactants and synergists along with an oil base constituent which is present in a proportional amount greater than 60 percent by volume of the combined total volume of the base, surfactant, and synergist constituents. A number of the surfactant and synergist constituents thus disclosed are non-surface-active in their chemical nature. The present invention contemplates the use of these non-surface-active ingredients in compositions wherein the oil base constituent is present in amounts ranging from zero to 60 percent by volume with respect to the combined total volume of the base, surfactant, and synergist constituents. In the composition of this invention, both the surfactant and the synergist constituent are to be non-surface-active in character. So long as this requirement is satisfied, any one or a combination of the known surface-active surfactants or synergists may be utilized, as applicable.

With regard to the type 2 surfactant ingredient, I have discovered that there are a number of water-soluble liquid materials which are incompatible with appropriate oily liquids as will be listed below, such that they may function as surfactant ingredients of the compositions of this invention. It will be understood that the term "surfactant", as used herein, includes such non-surface-active water-soluble constituents which are incompatible with appropriate oils.

A number of liquid substances have been found which satisfy the above-stated requirement, and which are not considered to have any surfact-active features at all. Yet, when they are employed in the compositions of the invention, they are capable of forming oil-water-compatible mixtures in a manner similar to a true surface-active detergent substance. Among such liquids are various pyrrolidones and pyrrolidone derivitives, dimethyl formamide, glycols, polyhydric alcohols, and polyethylene glycols. Also included are certain of the oil-insoluble water-soluble polypropylene glycols. Some useful non-surface-active substances employable as type 2 surfactants in the compositions of the invention are:

Pyrrolidone and pyrrolidone derivitives
2-Pyrrolidone
N-Methyl pyrrolidone (N-Methyl-2-pyrrolidone)
N-Vinyl pyrrolidone (N-Vinyl-2-pyrrolidone)
Esterified pyrrolidones
Dimethyl formamide
Oil-insoluble glycols
Triethylene glycol
Diethylene glycol
Polyethylene glycol
Water-soluble polypropylene glycols
polyhydric alcohols
Glycerin I have discovered that there are a number of useful liquids which may be employed as type 3 synergists in the compositions of the invention, and which are normally not considered to have any surface-active properties whatsoever. A few of these synergist liquids are listed as follows:

Chlorinated hydrocarbons
Methylene chloride
Trichloroethylene
Perchloroethylene
Monochlorobenzene
1,1,1-Trichloroethane
Oil-soluble esters
Water-insoluble polyalkylene glycol liquids (Ucon "LB" Fluids)
Diethylene glycol monobutyl ether acetate
Polyethylene glycol di(2-ethylhexoate) (Flexol 4GO)
Polyalkylene glycol derivitives (Flexol B-400)
Dioctyl phthalate
Water-insoluble alcohols
2-Ethylhexanol
Isodecanol
Tetrahydropyran-2-methanol
Benzene
Gasoline
Toluene
Ethylbenzene
Xylol (xylene)
Dimethyl naphthalene
Castor oil
Di(iso-decyl)4,5-epoxy tetrahydrophthalate (Flexol PEP)
Ethylhexyl-decyl phthalate (mixed ester) (Flexol 810)
Didecyl phthalate (Flexol 10-10)
Di(2-ethylhexyl) isophthalate (Flexol 380)

With regard to the type 4 coupler ingredient, which may be used in the compositions of the invention, these substances may be any one of a number of oil-water mutual solvents, used singly and in combination. Certain of the glycol-ethers, ketones, esters, and alcohols fall into this category, a few useful coupler materials being as follows:

Oil-soluble alcohols
Isopropanol
2-ethylhexanol
Tetrahydropyran-2-methanol
Octyl alcohol
Methyl isobutyl carbinol
Primary amyl alcohol
Tridecanol
Oil-soluble ketones
Isophorone
Di-isobutyl ketone
Oil-soluble glycol ethers
Ethylene glycol monoethyl ether
Ethylene glycol monobutyl ether
Diethylene glycol monobutyl ether
Diethylene glycol diethyl ether
Propylene glycol monomethyl ether
Oil-soluble esters
Diethylene glycol monomethyl ether acetate
Diethylene glycol monobutyl ether acetate It will be seen that there is some overlap in the categories of type 3 synergists and type 4 couplers. For example, in the case of alcohols, the lower member of which group behave definitely as couplers, such substances may act progressively more in the nature of synergists as their molecular weight and oil solubility are increased.

I have found that a useful means of identifying and classifying materials as synergists, couplers, etc., is in accordance with the physical behaviour which they exhibit. For example, the addition of both synergists and couplers tends to clear a haze condition which may be produced in a mixture of oil and water-soluble surfactant. On the other hand, an increase in synergist content tends to increase the effective water tolerance of the composition, at least up to a point, whereas an increase in coupler content tends to decrease the water tolerance of the composition.

Water enjoys a special place in the schedule of ingredient categories, for the reason that it may, under certain conditions, behave somewhat as a coupler or a synergist; that is, for water-compatible oil-base compositions. This is an unusual and unexpected effect, since water is not oily as are oil-in-water type synergists, nor is it a mutual solvent for oil and water as are the usual type 4 couplers. Under certain conditions, the addition of water to a hazy mixture of oil and type 2 water-soluble surfactant will act to reduce or clear the haze. For the purpose of the present invention, water, when used as a constituent for clearing or assisting in the clearing of haze, may be classed as a synergist.

With regard to the type 1 oil ingredient which may be used in the compositions of the invention I have found that this may be any oily material which has the property of forming a hazy mixture in the presence of the type 2 haze-producing water-soluble surfactant. Among such oily materials are various mineral oils, vegetable oils, and animal oils, a few of such oils being as follows:

Mineral oil
Absorption oil
Diesel fuel
Kerosene
Mineral thinner
Gasoline
Toluene
Corn oil
Linseed oil
Cottonseed oil
Castor oil
Cod liver oil
Benzene
Hexane
Heptane
Naphtha
Peanut oil
Olive oil
Neatsfoot oil
Turpentine
Xylene
Di(2-ethylhexyl) isophthalate (Flexol 380)
Di(2-ethylhexyl) adipate (Flexol A-26)

In the above listing, useful mineral oils may include a range of distillate fractions from light fuel fractions and light mineral thinners through kerosene-type fractions to light lubricating oils.

It will be noted that there is some overlap in the categories of the types 1 and 3 ingredients (as used in the compositions of the invention). For example, xylene, gasoline, toluene, and certain vegetable oils, such as castor oil, may serve as the type 1 oil ingredient which is in certain formulations added to a mixture of the type 2 and types 3 and/or 4 ingredients. These substances may also act as synergists, in that they will clear a haze which may be produced in the combination of a type 2 surfactant and an oil ingredient of low surfactant-compatibility. For example, a refined mineral thinner of the kerosene type in which the aromatic content is kept below about 8 percent will readily develop a haze when in combination with an ethoxylated nonylphenol in which the ethylene oxide content is about 10 mols per mol of nonylphenol. The addition of a few percent xylene or gasoline will tend to clear this haze.

As a further example, gasoline may be employed as a synergist, as described above, where the surfactant is a 10 mol ethoxylated nonylphenol; however, it may also be employed as a type 1 oil where the surfactant is a 15 or 20 mol ethoxylated nonylphenol. In such usage, where a haze is developed in a mixture of gasoline and a 15 mol ethoxylated akylphenol, the haze may be cleared by use of any suitable synergistic substance, such as isodecanol.

It will be understood that any normally liquid type 1 oil, type 2 surfactant, type 3 synergist, and type 4 coupler, may be used for the purpose of the invention. It will be further understood that the term "normally liquid" refers to materials which are fluid or semi-fluid at temperatures at or slightly above room temperature (75° F.), or which may be melted to a liquid state for use at slightly above room temperature, up to about the boiling point of water (212° F.). In some cases, non-liquid ingredients may be employed, provided they dissolve completely in the other liquid ingredients which are present so as to form a liquid composition.

In my copending application, Ser. No. 787,381, of which this application is a continuation-in-part, I have described in detail a method of determining the design features of oil-water-compatible compositions. An understanding of this method is important for the proper understanding of the compositions of the present invention and methods for preparation thereof.

Referring now to the FIGURE, there is here illustrated a typical matrix diagram of all possible compositions which may be derived from a type 1 oil, a type 2 water-soluble surfactant, and a type 3 synergist. In this chart, the axis of the abscissas is set forth on a scale of relative amounts of surfactant and synergist in the mixture, while the axis of ordinates is set forth on a scale of percentage of oil in the mixture of oil, surfactant and synergist.

For the purpose of devising a water-compatible oily composition in accordance with the method of the aforesaid application, Ser. No. 787,381, it is possible to enter this matrix diagram from the bottom left-hand corner. Firstly, an oil ingredient is selected, as, for example, a refined kerosene having about 7 percent aromatics. Secondly, a water-soluble surfactant material, as, for example, dimethyl formamide, such that certain mixtures of oil and surfactant may produce a haze.

Now, as various mixtures of oil and surfactant are tried, with an increasing percentage of oil, a point 11 will be found at which a haze first appears. Above this point 11, at values of zero synergist content on the axis of abscissas, all mixtures have a hazy character. Having thus established a hazy mixture of oil and surfactant, say at point 12, a synergist may then be added to clear the mixture. In the case of the diagram of the Figure, the synergist used is isodecanol, although other non-surface-active synergists might also be utilized, as well as the known surface-active synergists, and similar clearing characteristics will be obtained. Likewise, any one of the known surface-active surfactants might be substituted for the ethoxylated nonylphenol, as taught in application Ser. No. 787,381, and similar haze and clearing effects will be contained.

At any rate, the addition of a synergist material, to a point where the haze clears, produces a composition having a position in the matrix diagram corresponding to point 13. The line 14 represents the locus of points at which the haze-clearing effect occurs, all compositions to the left and above this line being hazy, and all compositions to the right and below this line being clear.

It will be found that the clear compositions corresponding to points to the right of line 14 will accept water to a certain extent to form clear mixtures. If now a small amount of water, as, for example, about 0.01 percent by volume, is added to the above-formulated mixture, and if, further, the concentration of the synergist ingredient is increased by small increments, a series of formulations will be obtained corresponding to those represented by points on the locus line 15.

Upon the continued addition of the synergist, a point 16 will finally be reached where a haze once again develops in the mixture. This point represents a limiting condition of water compatibility in the formulations of the matrix. Line 17 represents the locus of points of limiting water tolerance, all compositions to the left of this line being capable of accepting water in clear solution, and all compositions to the right of the line being incompatible with water.

In the region above line 14, there is a zone, between lines 14 and 18, which I call the "coupler zone". Within this zone, the hazy compositions may be cleared by the addition of a "coupler" liquid. Obviously, the hazy formulations within the coupler zone may be cleared by the addition of a synergist, in which case the composition would be changed so that its position in the matrix is shifted to the right. For purposes of usage of the matrix diagram, however, the addition of a coupler liquid to the composition does not alter the position of the formulation in the matrix.

Assume, for example, that a hazy formulation corresponding to point 12 is cleared by the addition of a small amount of ethylene glycol monobutyl ether. The thus-cleared mixture will now accept water in a proportional amount greater than about 0.01 percent, and, as before, an increase in the synergist content will eventually shift the composition to a point to the right of line 17 where the composition becomes incompatible with water.

In place of the ethylene glycol monobutyl ether, any one or a combination of various other couplers may be employed. As a special case, water may be used as a synergist or a coupler so as to clear the hazy formulations within the "coupler zone". When water is thus used as a clearing coupler, the thus-cleared mixtures will now accept more water, in a proportional amount greater than about 0.01 percent, as described above. It will be understood that a coupler constituent is generally employed in an amount just about sufficient to provide a satisfactory clearing or assist in clearing of haze. The amount used may vary from zero up to a proportional amount about equal to the amount of surfactant constituent which is present.

The figure 0.01 percent has been used above as an arbitrary measure of a limiting condition of water tolerance. Actually, the water tolerance rises sharply in formulations which are to the left of line 17, such that clear mixtures may be maintained at conditions of water content up to several percent, and, in some cases, up to 20 percent or 30 percent or even more. In fact, with some synergists, or couplers, notably isodecanol (which exhibits both synergists and coupler properties), oil mixtures may be formulated which will accept several hundred percent added water and still remain as clear solutions. In the example illustrated by the Figure, lines 19 and 20 represent the limiting condition of tolerance for 10 percent added water, all compositions in the zone below these lines being capable of accepting at least 10 percent added water while remaining in clear solution.

Within the region bounded by lines 14 and 17, and including the coupler zone up to line 18, as described above, various effects of gel-formation and emulsion-formation may be obtained. For example, in regions at the extreme left side of the matrix diagram, to the left of line 21, the addition of water may produce stiff gels which I call "super-gels" for the reason that they may become almost solid at certain concentrations of water. Usually, as the amount of added water is increased, the gel will "break" and an emulsion will form.

As we proceed to the right across the matrix diagram, a region may be encountered between lines 21 and 22, within which the formulations, when mixed with water, tend to form progressively softer gels and/or softer emulsions. Finally, to the right of line 22, the formulations tend to form weak or thin emulsions in the presence of water.

Line 23 represents a demarcation line between stable gels and emulsions, below the line, and unstable gels and emulsions above the line. For example, a formulation corresponding to point 24 would, upon the addition of water, form a super-gel which is broken up in the form of curds floating in a thin liquid phase. A formulation corresponding to point 25 may, upon the addition of water beyond a certain amount, develop into a thin emulsion which will separate on standing.

The effects of gel-formulation and emulsion-formation will, of course, vary considerably depending on the particular oil, surfactant, and synergist ingredients which are employed, but in general, the pattern of behaviour of the compositions within the above-described matrix diagram, will tend to be similar to that outlined. The above description of emulsion and gel-forming effects is not intended to be restricted to the specific features shown in the Figure.

Some very unusual effects may occur in the formation of gels and emulsions within the zone of water-compatibility as indicated by the matrix diagram of the Figure. For example, in a region indicated by point 26, the composition may exhibit the characteristic of a high viscosity gel up to an amount of added water greater than several hundred percent. And, in the region indicated by point 27, the formulations may exhibit an effect which I call a "super-emulsion" upon the addition of water. Super-emulsions have been observed which consist of the above-described oil-surfactant-synergist compositions along with as much as 8000 percent added water, and even with this great amount of added water, the emulsion may have a stiff consistency similar to a jelly or a custard material.

An important secondary feature of water-compatibility should be mentioned, this being in regard to water-washability. In the foregoing description of the matrix diagram of possible compositions of the invention water-compatible compositions have been considered to be those capable of accepting more than about 0.01 percent added water while remaining as a clear mixture. It will be found that certain of the compositions, as, for example, that represented by point 26 may accept more than 10 percent added water, yet when the composition is coated onto the surface of a part and the part is rinsed with water, the composition fails to wash from the part.

Again, referring to the Figure, line 30 represents a limiting condition of water-washability, all compositions represented by points to the left of this line being washable in water, and all compositions represented by points to the right of the line being nonwashable. This feature of water-washability is important in connection with compositions which are to be used as inspection penetrants, emulsifiers for inspection penetrants, oil-stripping cleaning compounds, or soaps, as will be described in the examples to be given below.

It will be understood that lines 21 and 22 in the Figure do not represent sharp changes in gel-forming or emulsion-forming characteristics of the compositions, but are intended merely to indicate regions within which a transition of characteristic behaviour occurs. Line 30, on the other hand, represents a demarcation between washability, on the left, and nonwashability, on the right, this change in character of the compositions being, usually, quite sharp. In many cases, a clear-out change from washable to nonwashable may occur within the range of as little as 1 percent synergist ingredient. The position of line 30 on the chart may be shifted to the right on the chart by the addition of a coupler ingredient.

In my copending application, Ser. No. 787,381, of which the present application is a continuation-in-part, I have disclosed and claimed emulsifier compositions all of which fall at points above line 32 in the matrix diagram of the Figure. It will be understood that in the case of the present invention, the emulsifier compositions are limited to those which fall below line 32 in the matrix diagram of the Figure, and in which both of the constituents, surfactant and synergist, are non-surface-active in character.

With regard to the type 5 extender liquid, which may be used in the compositions of the invention, this may be any one or a combination of liquids which may be employed as inactive extenders for use in adjusting solvency features or features of gel-break, viscosity, or other factors, liquified gasses for use as propellants in aerosol spray compositions, or volatile extenders for use in adjusting and controlling a dimensional sensitivity effect in accordance with my U.S. Pat. No. 3,300,642, issued Jan. 24, 1967, for "Method for Changing and Restoring the Sensitivity Characteristics of Diluted Penetrants". Among the various liquids which may be employed as extenders for the compositions of the invention are the following:

Water
Chlorinated hydrocarbons
Methylene chloride
Trichloroethylene
Perchloroethylene
Fluorocarbon propellant liquids
Glycols Certain of the above-mentioned extender liquids may also serve as type 3 synergists, type 4 couplers, or even as type 2 surfactants. for example, trichloroethylene may be added to a composition in which a pyrrolidone derivitive is employed as the type 2 surfactant, the addition of trichloroethylene being in the proportion of about 10 times the total volume of the quantity of surfactant which is present. If, now, the volatile trichloroethylene is allowed to evaporate, as from a thin layer of the composition, a semi-azeotropic mixture will tend to form in which the trichloroethylene content will be about 50 percent of the amount of the pyrrolidone material which is present. This residual trichloroethylene may then act as a synergist with respect to the pyrrolidone derivitive as a surfactant. It will be understood that extender liquids, when used in the compositions of the invention, may be employed in a wide range of proportional concentrations, ranging from zero to as much as 50 proportional parts or more, with respect to the combined volume of synergist, surfactant, and oil ingredients, depending on the desired mode of usage.

Each of the compositions of the invention may include, as stated above, a type 6 additive ingredient. Among the various additives which may be employed are:

Visible color indicator dyes
Fluorescent indicator dyes
Disinfectant chemicals
Insecticides
Pesticides
Herbicides
Perfumes
Deodorants
Rust inhibitor chemicals
Rust remover chemicals
X-Ray absorber tracer substances
Radioactive tracer substances
Pharmaceutical chemicals
Pigment powders
Abrasive powders With respect to indicator dyes, these are important in connection with compositions of the invention which are to be used as inspection penetrants. The dyestuff utilized may be in the form of a fluorescent sensitizer or of a visible dye. If a fluorescent sensitizer is employed, a "color-former" dye may be used in conjunction therewith. Any suitable dye or mixture of dyes may be chosen for the purpose. A large number of useful fluorescent dyes and methods for their use have been disclosed in my now-issued U.S. Pat. No. 3,386,920, issued June 4, 1968, for "Process for Fluorescence Detection of Extremely Small Flaws", now Reissue No. 26,888.

It will be understood that the performance characteristics of the sensitizer dyes, which may be utilized in the compositions of the invention, may be evaluated with respect to their thresholds of color or fluorescence response through use of my co-called "Meniscus-Method Apparatus", which is described and claimed in my U.S. Pat. No. 3,107,298, for "Apparatus for the Measurement of Fluorescent Tracer Sensitivity".

When the compositions of the invention are employed as water-washable inspection penetrants, or emulsifiers for post-emulsifiable penetrants, it may be desirable to adjust the balance condition between the surfactant and synergist constituents so as to provide a "long gel", as may be obtained with compositions corresponding to points 31 and 33 in the matrix diagram of the Figure, or as a short gel, as may be obtained with a composition corresponding to point 34 in the diagram. The advantages to be gained from a properly designed gel-forming inspection penetrant composition have been fully set forth in my U.S. Pat. Nos. 3,349,041 and 3,429,826. In many applications, the feature of gel-formation may not be important or desirable, and it may be merely necessary to provide a suitable degree of oil-water compatibility along with certain features of solvency for additive ingredients, viscosity, economy, etc. In such cases, it may be found advantageous to utilize certain of the compositions of the invention which provide oil-water compatibility without any effects of gel-formation.

EXAMPLE NO. 1

A series of tests were carried out using methylene chloride as a type 3 synergist ingredient, and with various non-surface-active materials used as type 2 surfactants. Mixtures of 7 parts surfactant, 3 parts synergist (methylene chloride), and 0.1 parts water (1 percent) were prepared, and the mixtures were tested as to their compatibility with typical oils, such as mineral oil (100 pale) and a refined kerosene (7 percent aromatics).

TABLE I

| Surfactant | Oil Tolerance to First Haze (% added oil) | |
|---|---|---|
| | Mineral Oil (100 S.U.S) | Kerosene |
| Dimethyl formamide | 1% | 23% |
| 2-Pyrrolidone | 4% | 19% |
| N-Vinyl pyrrolidone | 14% | 29% |
| N-Methyl pyrrolidone | 1% | 16% |
| Triethylene glycol | 1% | 1% |
| Ethoxylated Nonylphenol (9 mols ethylene oxide) (Surface-active) | 100% | 270% |

EXAMPLE NO. 2

A series of tests were carried out using methylene chloride as a type 3 synergist ingredient and with various non-surface-active materials used as type 2 surfactants. Mixtures of 7 parts surfactant, 3 parts synergist (methylene chloride), and 0.5 parts (5 percent) oil (refined kerosene with 7 percent aromatics) were prepared, and the mixtures were tested as to their compatibility with water.

TABLE II

| Surfactant | Water Tolerance to First Haze (% added water) |
|---|---|
| Dimethyl formamide | 12% |
| 2-Pyrrolidone | 11% |
| N-Vinyl pyrrolidone | 3% |
| N-Methyl pyrrolidone | 25% |
| Ethoxylated Nonylphenol (9 mols ethylene oxide) (Surface-active | 5% |

EXAMPLE NO. 3

A series of tests, similar to those of Example No. 1, were carried out using isodecanol as the synergist ingredient.

TABLE III

| Surfactant | Oil Tolerance to First Haze (% added oil) | |
|---|---|---|
| | Mineral Oil (100 S.U.S) | Kerosene |
| Dimethyl formamide | 1% | 12% |
| 2-Pyrrolidone | 6% | 28% |
| N-Vinyl pyrrolidone | 44% | 66% |
| N-Methyl pyrrolidone | 4% | 39% |
| Triethylene glycol | 3% | 7% |
| Polyethylene glycol (M.W.=200) | 3% | 10% |
| Ethoxylated nonylphenol (9 mols ethylene oxide) (Surface-active) | 78% | 400% |

EXAMPLE NO. 4

A series of tests, similar to those of Example No. 2, were carried out using isodecanol as the synergist ingredient.

TABLE IV

| Surfactant | Water Tolerance to First Haze (% added water) |
|---|---|
| Dimethyl formamide | 15% |
| 2-Pyrrolidone | 15% |
| N-Vinyl pyrrolidone | 5% |
| N-Methyl pyrrolidone | 14% |
| Triethylene glycol | 3% |
| Polyethylene glycol (M.W. = 200) | 6% |
| Ethoxylated nonylphenol (9 mols ethylene oxide) (Surface-active) | 33% |

It was found that similar features of oil-water compatibility are obtainable with various combinations of other of the above-listed surfactant and synergist materials. The maximum degree of oil-tolerance or water-tolerance of a given combination of ingredients will depend to a great extent on the relative proportional amounts of surfactant and synergist ingredients. In addition to the above, it has been found that while the use of a non-surface-active surfactant with a non-surface-active synergist may yield a condition of oil-water compatibility as indicated in the examples above, there is usually little or no effect of gel-formation in the presence of added water. If, on the other hand, the surfactant ingredient is a surface-active substance, then a pronounced effect of gel-formation may be obtained, up to the critical point of added water where the gel breaks into an emulsion.

EXAMPLE NO. 5

In an inspection penetrant process employing a high-sensitivity water-washable fluorescent penetrant of the type disclosed and claimed in my U.S. Pat. No. 3,282,843, it was desired to use the penetrant on jet engine turbine buckets which were coated with a porous heat-resistant coating. With test parts of this kind, it was found that the surface porosity caused an excessive amount of background fluorescence which obscured any cracks which were present in the part.

In was desired to utilize a pre-rinse, consisting of methylene chloride, for the purpose of stripping off some or all of the unwanted surface-porosity indications, and to this end a dip tank of methylene chloride was prepared in which the body of the methylene chloride was covered by a layer of water to prevent excessive evaporative loss of the methylene chloride. The test parts (turbine buckets) were placed in a wire basket, and were treated with the fluorescent penetrant. After a suitable drain-dwell time to allow the penetrant to enter any cracks in the parts, the parts were dipped into the tank of methylene chloride, and were agitated for about 10 seconds. The parts were then withdrawn from the dip tank and were immediately rinsed with a spray of water in accordance with normal washing procedures. The parts were then developed using a conventional dry powder developer, and were examined under ultraviolet light (black light) for the presence of any crack indications.

The inspection under black light revealed that there were a considerable number of undesirable smears and spots of blotchy fluorescent residues remaining on the test surfaces, even though the unwanted background of porosity indications was largely removed. A small proportional amount of dimethyl formamide was added to the bath of methylene chloride, sufficient to render the methylene chloride compatible with water to a small degree. The bath composition was prepared as follows:

| | |
|---|---|
| Methylene chloride | 4 parts |
| Dimethyl formamide | 1 part |

The above bath was found to be capable of accepting about .2 percent of added water while remaining as a clear mixture. The bath was found to be only partially compatible with water, so that the addition of a larger amount of water resulted in the formation of a distinct layer of water floating on the surface of the body of methylene chloride.

A re-test of the turbine buckets, in accordance with the procedure set forth above, now produced the result wherein no unwanted blotchy smears or fluorescent residues were left on the test parts. The unwanted background porosity indications were removed cleanly, leaving crack indications which were clearly and distinctly visible. A conventional developer of the dry powder type was applied to the test parts, in accordance with known methods, thereby augmenting the fluorescent brightness of the crack indications.

It will be understood that the compositions described herein (supra) and their modes of usage are preferred compositions and modes of usage. However, various changes may be made without departing from the spirit and scope of the disclosure, these being limited only by the appended claims.

I claim:

1. In an inspection penetrant process in which test parts are (1) treated with an oil-water compatible composition (2) excess surface material is removed by washing with water and (3) said parts are inspected for the presence of entrapments of penetrant in surface cracks, the improvement wherein oil-water compatible composition consists essentially of the following ingredients within the indicated proportional amounts:

| | |
|---|---|
| Surfactant constituent | 34 to 14 parts |
| Synergist constituent | 6 to 26 parts |
| Oil constituent | zero to 60 parts |
| Coupler constituent | zero to 34 parts | and from zero to 10 percent added water maintained in clear solution; said surfactant constituent being at least one member selected from the group consisting of
  2-pyrrolidone,
  N-methyl pyrrolidone,
  N-vinyl pyrrolidone,
  dimethyl formamide,
  triethylene glycol,
  diethylene glycol, and
  glycerin;
said synergist constituent being at least one member selected from the group consisting of
  methylene chloride,
  trichloroethylene,
  perchloroethylene,
  monochlorobenzene,
  1,1,1 trichloroethane
  polyethylene glycol di(2-ethylhexoate),
  dioctyl phthalate,
  2-ethylhexanol,
  isodecanol,
  tetrahydropyran-2-methanol,
  benzene,
  gasoline,
  toluene,
  ethylbenzene,
  xylene,
  dimethyl naphthalene,
  castor oil,
  di(iso-decyl)4,5-epoxy tetrahydrophthalate,
  ethylhexyl-decyl phthalate,
  didecyl phthalate, and
  di(2-ethylhexyl) isophthalate;
said oil constituent being at least one member selected from the group consisting of
  mineral oil,
  diesel fuel,
  kerosene,
  mineral thinner,
  corn oil,
  linseed oil,
  cottonseed oil,
  hexane,
  heptane,
  naphtha,
  peanut oil,
  olive oil, and
  turpentine; and
said coupler constituent being at least one member selected from the group consisting of
  isopropanol,
  octyl alcohol,
  methyl isobutyl carbinol,
  primary amyl alcohol,
  tridecanol,
  isophorone,
  di-isobutyl ketone,
  ethylene glycol monobutyl ether,
  ethylene glycol monoethyl ether,
  diethylene glycol monobutyl ether,
  diethylene glycol diethyl ether,
  propylene glycol monomethyl ether,
  diethylene glycol monomethyl ether acetate, and
  diethylene glycol monobutyl ether acetate.

2. A process in accordance with claim 1 in which said surfactant constituent is dimethyl formamide, said synergist constituent is methylene chloride, said oil constituent is mineral thinner, and said coupler constituent is ethylene glycol monobutyl ether.

3. A process in accordance with claim 1 in which said surfactant constituent is dimethyl formamide, said synergist constituent is benzene, said oil constituent is mineral thinner, and said coupler constituent is isopropanol.

4. A process in accordance with claim 1 in which said surfactant constituents is N-methyl pyrrolidone, said synergist constituent is 1.1.1-trichloroethane, said oil constituent is mineral thinner, and said coupler constituent is ethylene glycol monobutyl ether.

5. A process in accordance with claim 1 in which said surfactant constituent is diethylene glycol, said synergist constituent is perchloroethylene, said oil constituent is mineral thinner, and said coupler constituent is ethylene glycol monobutyl ether.

6. A process in accordance with claim 1 in which said surfactant constituent is diethylene glycol, said synergist constituent is dioctyl phthalate, said oil constituent is mineral oil, and said coupler constituent is diethylene glycol monobutyl ether.

* * * * *